(12) United States Patent
Yang et al.

(10) Patent No.: US 10,700,881 B2
(45) Date of Patent: Jun. 30, 2020

(54) METHOD AND APPARATUS FOR POLICY HANDLING

(71) Applicant: Telefonaktiebolaget LM Ericsson (publ), Stockholm (SE)

(72) Inventors: Hui Yang, Shanghai (CN); Juying Gan, Shanghai (CN); Chengqiong Xie, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/079,363

(22) PCT Filed: Feb. 26, 2016

(86) PCT No.: PCT/CN2016/074718
§ 371 (c)(1),
(2) Date: Aug. 23, 2018

(87) PCT Pub. No.: WO2017/143593
PCT Pub. Date: Aug. 31, 2017

(65) Prior Publication Data
US 2019/0058605 A1    Feb. 21, 2019

(51) Int. Cl.
*H04M 11/00*    (2006.01)
*H04L 12/14*    (2006.01)
(Continued)

(52) U.S. Cl.
CPC .......... *H04L 12/1407* (2013.01); *H04L 12/14* (2013.01); *H04L 61/3075* (2013.01);
(Continued)

(58) Field of Classification Search
CPC . H04L 12/1407; H04L 61/3075; H04M 15/66
(Continued)

(56) References Cited

U.S. PATENT DOCUMENTS

2011/0263238 A1* 10/2011 Riley ................. H04M 15/00
                                                    455/418
2012/0081557 A1*  4/2012 Kupinsky ........... H04L 12/1407
                                                    348/207.1
(Continued)

FOREIGN PATENT DOCUMENTS

CN          102065402 A     5/2011
CN          103002426 A     3/2013
(Continued)

OTHER PUBLICATIONS

International Search Report and Written Opinion of the International Searching Authority, PCT/CN2016/074718, dated Oct. 24, 2016, 7 pages.
(Continued)

*Primary Examiner* — Huy C Ho
(74) *Attorney, Agent, or Firm* — Sage Patent Group

(57) ABSTRACT

Embodiments of the present disclosure provide a method performed at a Policy and Charging Rule Function, PCRF, entity for provisioning policy information. The method comprises preparing policy information for provision to a PCEF entity and then provisioning the policy information to the PCEF entity. The method also comprises indicating a recurring time interval for applying a policy associated with the policy information to the PCEF entity such that the policy can be applied at the PCEF repeatedly at the recurring time interval without further provisioning of the policy information to the PCEF entity. Correspondingly, there is also provided a method performed at a Policy and Charging Enforcement Function, PCEF, entity for applying a policy. Apparatuses embodied at the PCRF and PCEF are also provided.

12 Claims, 7 Drawing Sheets

(51) Int. Cl.
*H04M 15/00* (2006.01)
*H04W 4/24* (2018.01)
*H04L 29/12* (2006.01)

(52) U.S. Cl.
CPC .......... *H04M 15/00* (2013.01); *H04M 15/66* (2013.01); *H04W 4/24* (2013.01)

(58) Field of Classification Search
USPC ........................................................ 455/406
See application file for complete search history.

(56) References Cited

U.S. PATENT DOCUMENTS

| | | | |
|---|---|---|---|
| 2012/0233337 | A1 | 9/2012 | Zhou et al. |
| 2015/0296531 | A1* | 10/2015 | Xue ................... H04L 41/5019 370/336 |

FOREIGN PATENT DOCUMENTS

| | | |
|---|---|---|
| CN | 103229454 A | 7/2013 |
| CN | 103684844 A | 3/2014 |

OTHER PUBLICATIONS

3GPP, 3$^{rd}$ Generation Partnership Project; Technical Specification of Group Services and System Aspects; Policy and charging control architecture (Release 13); 3GPP TS 23.203 v13.0.0 (Jun. 2014), 220 pages.

3GPP, 3$^{rd}$ Generation Partnership Project; Technical Specification of Group Core Network and Terminals; Policy and Charging Control (PCC); Reference points (Release 13), 3GPP TS 29.212 v13.0.0 (Dec. 2014), 231 pages.

3GPP, 3$^{rd}$ Generation Partnership Project; Technical Specification of Group Core Network and Terminals; Policy and Charging Control signalling flows and Quality of Service (QoS) parameter mapping (Release 13); 3GPP TS 29.213 v13.4.0 (Dec. 2015), 219 pages.

3GPP, 3$^{rd}$ Generation Partnership Project; Technical Specification of Group Core Network and Terminals; Policy and Charging Control over Rx reference point (Release 13), 3GPP TS 29.214 v13.4.0 (Dec. 2015), 66 pages.

Extended European Search Report dated Sep. 20, 2019 for European Patent Application No. 16891047.9, 7 pages.

* cited by examiner

METHOD AND APPARATUS FOR POLICY HANDLING

CROSS REFERENCE TO RELATED APPLICATION

This application is a 35 U.S.C. § 371 national stage application of PCT International Application No. PCT/CN2016/074718 filed on Feb. 26, 2016, the disclosure and content of which is incorporated by reference herein in its entirety.

TECHNICAL FIELD

The non-limiting and exemplary embodiments of the present disclosure generally relate to the communications field, and specifically to methods, apparatuses, and a computer program product for time-based policy provisioning and applying.

BACKGROUND

This section introduces aspects that may facilitate better understanding of the present disclosure. Accordingly, the statements of this section are to be read in this light and are not to be understood as admissions about what is in the prior art or what is not in the prior art.

In a Long Term Evolution (LTE) network, all communications are carried over an Internet Protocol (IP) channel from user equipment (UE) to an all-IP core called the Evolved Packet Core (EPC). The EPC then provides gateway access to other networks while ensuring an acceptable quality of experience and charging a subscriber for his/her particular network activity.

The 3rd Generation Partnership Project (3GPP) generally describes components of the EPC and their interactions with each other in a number of technical specifications (TS). Specifically, 3GPP TS 23.203, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications also define Policy and Charging Control (PCC) architecture and provide some guidance as to how the aforesaid elements interact in order to provide reliable data services and charge subscribers for use thereof.

As an example, FIG. 1 represents the PCC architecture as defined in FIGS. 5.1-1 of 3GPP TS 23.203 V13.6.0. The PCC architecture includes, amongst other entities, a PCRF in charge of policy control decision and flow based charging control functionalities, as well as in charge of provision of PCC rules to be enforced at the bearer layer; a PCEF which may be embodied in a Packet Data Network Gateway (PGW), a Serving GPRS (General Packet Radio Service) Support Node (SSGN) or the like and in charge of service data flow detection based on filters included in the PCC rules received from the PCRF, as well as in charge of PCC rules enforcement at the bearer layer; and an Application Function (AF) for offering applications.

Regarding the communication between the above PCC entities, as disclosed in 3GPP TS 23.203, PCRF and PCEF communicate through a so-called Gx interface, whereas PCRF and AF communicate through a so-called Rx interface. In particular, the PCRF provides control rules to the PCEF through the Gx interface, whereas the AF provides the description of the media to be delivered at the bearer layer to the PCRF through the Rx interface. Regarding the control rules submitted from the PCRF to the PCEF, these control rules include, although are not limited to, those PCC rules disclosed in 3GPP TS 23.203, and can be provided upon establishment or modification of an IP Connectivity Access Network (IP-CAN) session.

In 3GPP TS 29.212 V13.4.0, the Gx interface is particularly defined for provisioning and removal of PCC rules from the PCRF to the PCEF and transmission of traffic plane events from the PCEF to the PCRF. The Gx interface can be used for charging control, policy control or both by applying Attribute Value Pairs (AVPs) to carry policy information.

A policy based on time (which is also called 'time-based policy' hereafter) allows an operator to apply a specific control rule, e.g. a PCC rule or an Access Point Name-Aggregated Max Bit Rate (APN-AMBR) value, to a user during a certain time period. For example, according to a time-based policy, a PCC rule for controlling bandwidth of a Peer-to-Peer (P2P) service may be activated to limit the bandwidth of the P2P service for most hours of a day and deactivated to release the limitation for a few hours early in the morning. According to another time-based policy, an APN-AMBR value may be applied to an IP-CAN session for peak hours of a day and another APN-AMBR value may be applied for non-peak hours.

Currently, activation and deactivation of a control rule, e.g. a PCC rule, may be achieved by either of the following mechanisms according to a time-based policy.

In the first mechanism, the activation/deactivation of a PCC rule is completely controlled by the PCRF.

For example, a time-based policy specifies that a PCC rule for limiting the bandwidth of a P2P service shall be applied during a day except an 'early morning' period. Then when the 'early morning' period starts in the day, the PCRF deactivates the PCC rule which limits the bandwidth of the P2P service, and when the 'early morning' period ends, the PCRF activates the PCC rule so that the bandwidth limiting is applied to the P2P service.

Then, in the following day, the PCRF repeats the same activation and deactivation operations when the 'early morning' period starts and ends.

A main drawback of the first mechanism is a signaling storm on the Gx interface because the PCRF may need to provide the time-based policy for all users at the same time point.

In the second mechanism, the activation/deactivation of a control rule, e.g. a PCC rule, is controlled by the PCEF.

This mechanism is specified in clause 4.5.13 "Time of the day procedures" in 3GPP TS 29.212 V13.4.0, aiming to avoid the signaling storm on the Gx interface as caused in the first mechanism.

In the second mechanism, the PCRF instructs the PCEF to defer the activation and/or deactivation of the PCC rule. The PCRF may also instruct the PCEF to request a new rule after a certain time period, e.g. Revalidation-Time as defined in TS 3GPP TS 29.212 V13.4.0. In order to do so, the PCRF provides the Event-Trigger AVP with the value REVALIDATION_TIMEOUT and in addition, the Revalidation-Time AVP. This will cause the PCEF to trigger a PCRF interaction to request a PCC rule from the PCRF for an established IP CAN session upon expiration of the Revalidation-Time.

According to 3GPP TS 29.212 V13.4.0, the PCEF shall send the PCC rule request before the indicated revalidation time. The PCRF is expected to be prepared to provide a new policy, as desired for the revalidation time, during a preconfigured period before the revalidation time. The preconfigured periods in the PCEF and the PCRF need to be aligned.

Additionally, APN-AMBR provisioning on the basis of time can also be achieved by using a time-based policy completely controlled by the PCRF. Likewise, when the time is due for a new APN-AMBR, the PCRF may provision the new APN-AMBR in a Re-Auth-Request (RAR) message.

For example, a time-based policy specifies that different APN-AMBR values are applied for peak and non-peak hours in a day. Then according to this policy, the PCRF may cause the APN-AMBR to be limited to 20 Mbps during the peak hours, and cause the APN-AMBR to be increased to 50 Mbps during the non-peak hours.

In the recent 3GPP SA2 #112 meeting, some operators require support of a deferred APN-AMBR in order to reduce signaling on the Gx interface. That is, in addition to providing an authorized APN-AMBR for the ongoing session, the PCRF should also be able to provide an APN-AMBR value that is expected to be applied at a later time point, or provide a list of APN-AMBR values that are expected to be applied at later time points which are actually recurring.

SUMMARY

When an operator defines a time based policy, it's very common to define a recurring time based policy, which may be repeatedly applied every day or every week and the like. For example, a busy-hour policy for enforcing a PCC rule of limiting the bandwidth for an IP-CAN session during busy hours may be repeatedly applied every day, while a weekday policy for enforcing a PCC rule of limiting the bandwidth during week days may be repeatedly applied every week.

When the recurring time based policy is applied, the existing solution in the first mechanism as described above may cause a signaling storm on the Gx interface. While the solution in the second mechanism as described above may solve the problem of signaling storm on the Gx interface to some extent, two other potential problems as follows may be foreseen.

The first problem may be that the time based policy may not be applied as expected, if the preconfigured period for revalidation overlaps with the current activation period.

For example, if an operator would like to limit the P2P service for most of the time of a day, but remove the limit from 0:00 am to 5:00 am every day, the revalidation time may be indicated at 24:00 pm. The expected policy enforcement may be performed by the PCEF as activating a PCC_P2P rule with bandwidth throttling from 5:00 am to 24:00 pm and deactivating the PCC_P2P rule from 0:00 am to 5:00 am.

If a user sets up a Packet Data Network (PDN) connection (which is also called IP-CAN session) during a day, then the PCRF may install the PCC_P2P policy with following values: Rule-Activation-Time="5:00 am of that day"; Rule-Deactivation-Time="24:00 pm of that day"; and Revalidation-Time="24:00 pm of that day".

In order to avoid the Gx signaling storm due to new policy requesting, the PCEF needs to send a PCC rule revalidation request before the indicated revalidation time, i.e. before 24:00 pm, say 1 hour before the indicated time. That is, the PCEF may start to request a new policy at 23:00 pm.

Correspondingly, the PCRF may be also configured in a way so that it is prepared to provide the new policy between 23:00 pm and 24:00 pm. The new policy for the PCC_P2P service will include: Rule-Activation-Time="5:00 am of the next day"; Rule-Deactivation-Time="24:00 pm of the next day"; and Revalidation-Time="24:00 pm of the next day".

As a consequence, if the PCEF receives the new policy at 23:00 pm, it will remove the PCC_P2P rule, which means the bandwidth throttling for the P2P service will be removed one hour earlier than expected.

The second problem is that unnecessary signaling on the Gx interface may be caused.

With the existing solution in the second mechanism as described, the PCEF needs to initiate policy requesting everyday even if the same policy is supposed to be used every day. Therefore, the signaling for requesting the policy on the Gx interface is actually unnecessary and redundant, which increases the load in the PCEF and the PCRF.

As for APN-AMBR provisioning, the current solution assumes that max 4 reoccurrences of APN-AMBR together with APN-AMBR change time can be provisioned by PCRF to PCEF. In the case of more than the 4 reoccurrences, recurring APN-AMBR provisioning may be needed and thus require Gx signaling. Accordingly, similar problems as mentioned above with regard to the recurring time-based policy may also be foreseen.

In order to solve at least a part of the above problems, various embodiments of the present disclosure provide an efficient solution for provisioning and repeatedly applying a time-base policy. Other features and advantages of embodiments of the present disclosure will also be understood from the following description of specific embodiments when read in conjunction with the accompanying drawings.

In a first aspect of the present disclosure, there is provided a method performed at a PCRF entity for provisioning policy information. The method comprises preparing policy information for provision to a PCEF entity and then provisioning the policy information to the PCEF entity. The method also comprises indicating a recurring time interval in the policy information for applying a policy associated with the policy information to the PCEF entity such that the policy can be applied at the PCEF repeatedly at the recurring time interval without further provisioning of the policy information to the PCEF entity.

In an embodiment, the policy information may specify timing for activating and deactivating a PCC Rule. In this case, the recurring time interval represents an interval between successive activation of the PCC rule or between successive deactivation of the PCC rule.

In a further embodiment, the recurring time interval may be indicated to the PCEF entity in a Charging-Rule-Install AVP of a Credit-Control-Answer (CCA)-initial message upon establishment of an IP-CAN session. Alternatively, the recurring time interval may be indicated to the PCEF in a Charging-Rule-Install AVP of a CCA-update message or in a Re-Auth-Request (RAR) message after an IP-CAN session is established.

In another embodiment, the policy information may specify timing for starting and stopping an APN-AMBR. In this case, the recurring time interval represents an interval between successive start of the APN-AMBR or between successive stop of the APN-MMBR.

In a further embodiment, the recurring time interval may be indicated to the PCEF entity in a QoS Information AVP of a CCA-initial message when an IP-CAN session is established. Alternatively, the recurring time interval may be indicated to the PCEF in a QoS Information AVP of a CCA-update message or of a RAR message after an IP-CAN session is established.

In yet another embodiment, the method may further comprise modifying the recurring time interval. In this embodiment, the recurring time interval indicated to the PCEF comprises the modified recurring time interval.

In a second aspect of the present disclosure, there is provided a method performed at a PCEF entity for applying a policy. The method comprises receiving policy information associated with the policy from a PCRF entity and also obtaining an indication of a recurring time interval in the policy information for applying the policy from the PCRF entity. The method further comprises applying the policy repeatedly at the recurring time interval without further receiving the policy information from the PCRF entity.

In an embodiment, the policy information may specify an activation time for activating a PCC Rule and a deactivation time for deactivating the PCC rule. In this case, the recurring time interval represents an interval between successive activation of the PCC rule or between successive deactivation of the PCC rule.

In a further embodiment, the PCEF may calculate a next activation time for activating the PCC rule based at least on the activation time and the recurring time interval and calculate a next deactivation time for deactivating the PCC rule based at least on the deactivation time and the recurring time interval. In this embodiment, said applying the policy may further comprise activating the PCC rule at the calculated next activation time and deactivating the PCC rule at the calculated next deactivation time.

In another embodiment, the policy information may specify a start time for starting an APN-AMBR and a stop time for stopping the APN-AMBR. In this case, the recurring time interval represents an interval between successive start of the APN-AMBR or between successive stop of the APN-AMBR.

In a further embodiment, the PCEF may calculate a next start time for starting the APN-AMBR based at least on the start time and the recurring time interval and calculate a next stop time for stopping the APN-AMBR based at least on the stop time and the recurring time interval. In this embodiment, said applying the policy may further comprise starting the APN-AMBR at the calculated next start time and stopping the APN-AMBR at the calculated next stop time.

In a third aspect of the present disclosure, there is provided an apparatus embodied at a PCRF entity for provisioning policy information. The apparatus comprises a policy preparing unit, a policy provisioning unit and an indicating unit. The policy preparing unit is configured to prepare policy information for provision to a PCEF entity. The policy provisioning unit is configured to provision the policy information to the PCEF entity. The indicating unit is configured to indicate a recurring time interval for applying a policy associated with the policy information to the PCEF entity such that the policy can be applied at the PCEF repeatedly at the recurring time interval without further provisioning of the policy information to the PCEF entity.

In a fourth aspect of the present disclosure, there is provided an apparatus embodied at a PCEF entity for applying a policy. The apparatus comprises a policy receiving unit, an indication obtaining unit and a policy applying unit. The policy receiving unit is configured to receive policy information associated with the policy from a PCRF entity. The indication obtaining unit is configured to obtain an indication of a recurring time interval in the policy information for applying the policy from the PCRF entity. The policy applying unit is configured to apply the policy repeatedly at the recurring time interval without further receiving the policy information from the PCRF entity.

In a fifth aspect of the present disclosure, there is provided an apparatus embodied at a PCRF entity for provisioning policy information. The apparatus comprises a processor and a memory. The memory contains instructions executable by the processor, whereby the apparatus is operative to perform the method according to the first aspect of the present disclosure.

In a sixth aspect of the present disclosure, there is provided an apparatus embodied at a PCEF entity for applying a policy. The apparatus comprises a processor and a memory. The memory contains instructions executable by the processor, whereby the apparatus is operative to perform the method according to the second aspect of the present disclosure.

In a seventh aspect of the present disclosure, there is provided a computer program product, comprising instructions which, when executed on at least one processor, cause the at least one processor to carry out the method according to the first or second aspect of the present disclosure.

It shall be appreciated that various embodiments of the first aspect may be equivalently applied to the third, fifth and seventh aspect of the present disclosure, while various embodiments of the second aspect may be equivalently applied to the fourth, sixth and seventh aspect of the present disclosure.

According to various aspects and embodiments as mentioned above, an effective and efficient solution for provisioning and repeatedly applying a time-based policy is proposed. With this solution, a signalling storm on the Gx interface may be avoided and enforcement of the time-based policy may be accurately performed as expected.

BRIEF DESCRIPTION OF THE DRAWINGS

The above and other aspects, features, and benefits of various embodiments of the present disclosure will become more fully apparent from the following detailed description with reference to the accompanying drawings, in which.

Like reference numbers and designations in the various drawings indicate like elements.

DETAILED DESCRIPTION

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "an embodiment," "another embodiment," "yet another embodiment," etc. indicate that the embodiment described may include a particular feature, structure, or characteristic, but every embodiment may not necessarily include the particular feature, structure, or characteristic. Moreover, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms in association.

The terminology used herein is for the purpose of describing particular embodiments only and is not intended to limit the embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 1:
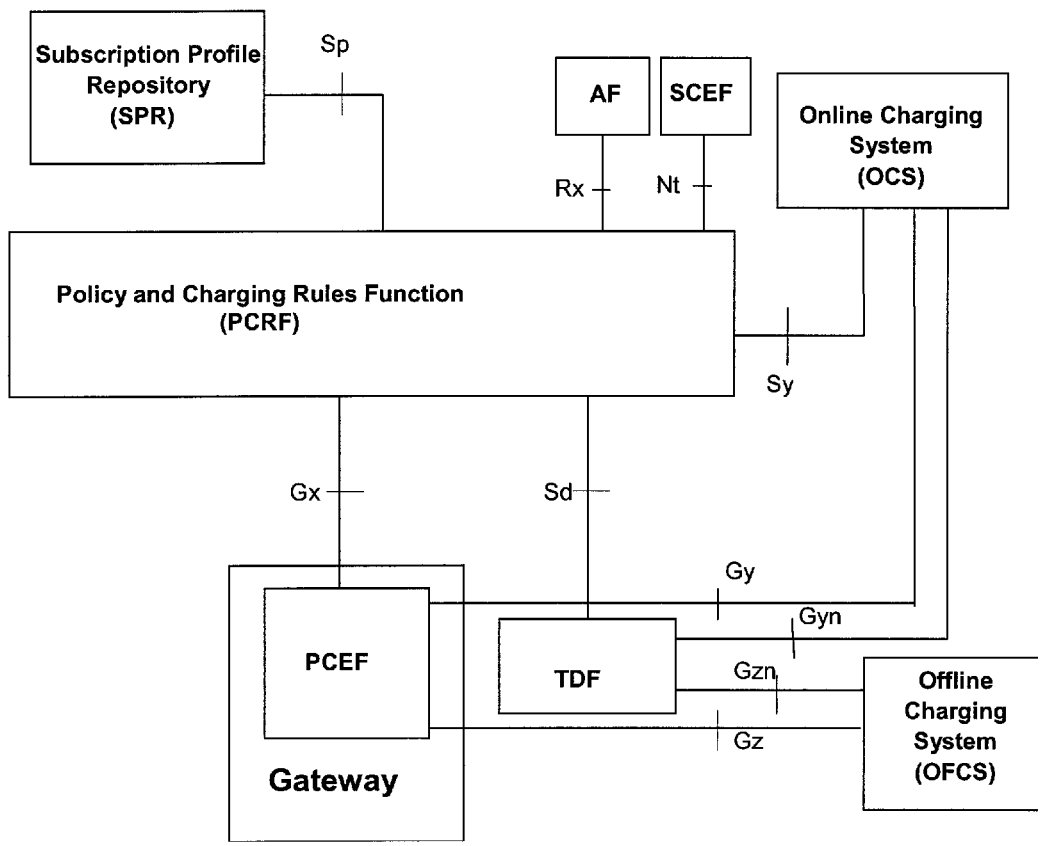
FIG. 1 depicts relationships between different functional entities involved in the Gx reference point as specified in 3GPP TS 29.212 V13.4.0.
Figure 2:
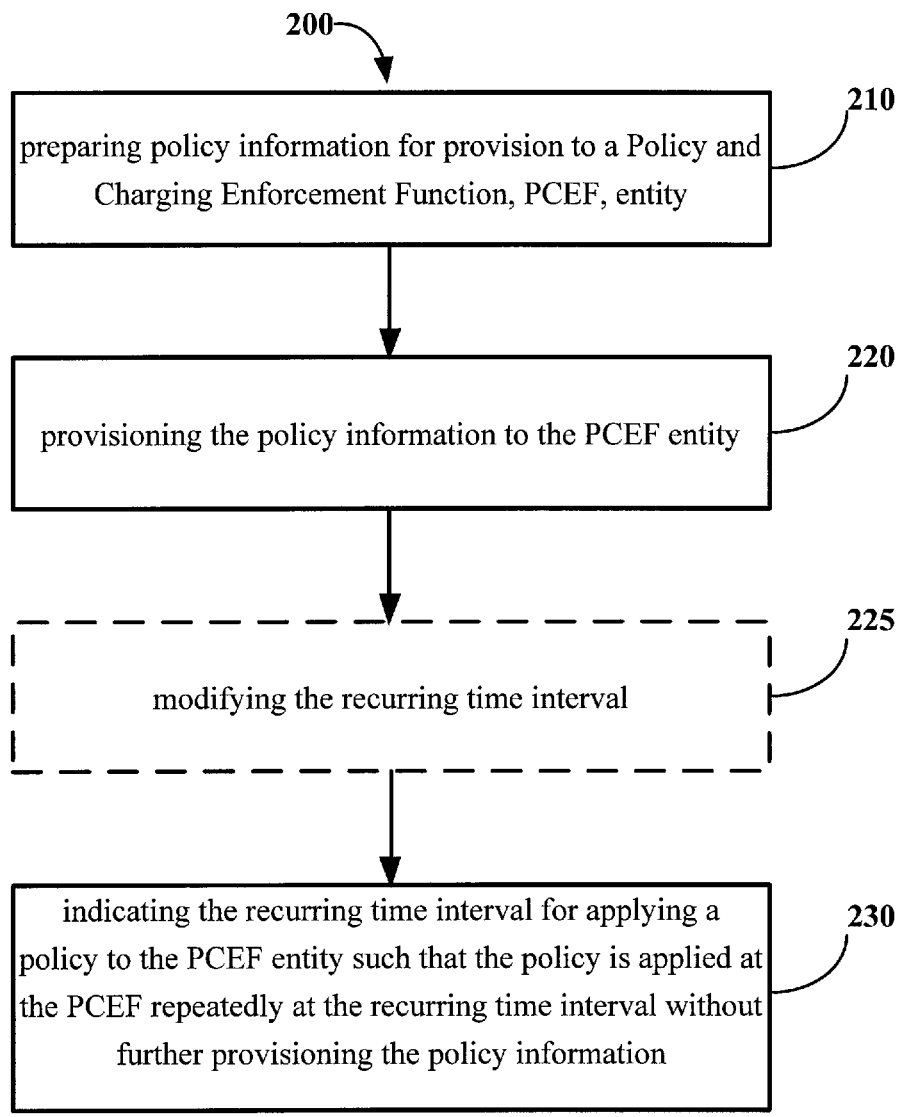
FIG. 2 illustrates a flowchart of a method performed at a PCRF entity for provisioning policy information according to some embodiments of the present disclosure.

FIG. 2 illustrates a flowchart of a method 200 performed at a PCRF entity for provisioning policy information according to some embodiments of the present disclosure.

In FIG. 2, operations in blocks with a solid line are essential, while operations in blocks with a broken line are optional depending on various implementations of the method 200.

As illustrated, the method 200 starts at block 210, in which the PCRF prepares policy information for provision to a PCEF entity. The policy information may specify timing for activating and deactivating a control rule. In this document, the control rule may comprise a PCC rule and an APN-AMBR value as examples. In the example that the control rule comprises a PCC rule, the policy information may specify an activation time for activating the PCC rule and a deactivation time for deactivating the PCC rule. In the example that the control rule comprises an APN-AMBR value, the policy information may specify a start time for starting the APN-AMBR and a stop time for stopping the APN-AMBR.

Then at block 220, the PCRF provisions the policy information to the PCEF entity, for example by actively pushing or in response to a request from the PCEF entity.

At block 230, the PCRF indicates a recurring time interval in the policy information for applying a policy associated with the policy information to the PCEF entity such that the policy can be applied at the PCEF repeatedly at the recurring time interval without further provisioning of the policy information to the PCEF entity.

In an embodiment that the policy information specifies timing for activating and deactivating a PCC Rule, the recurring time interval may be indicated to the PCEF entity in a Charging-Rule-Install AVP of a CCA-initial message upon establishment of an IP-CAN session. In this case, the policy information as a whole may be provisioned in the Charging-Rule-Install AVP of the CCA-initial message. Additionally or alternatively, the recurring time interval may be indicated to the PCEF in a Charging-Rule-Install AVP of a CCA-update message or of a RAR message after an IP-CAN session is established. In this case, the policy information as a whole may be provisioned in the Charging-Rule-Install AVP of the CCA-update message or of the RAR message. The recurring time interval represents an interval between successive activation of the PCC rule or between successive deactivation of the PCC rule.

As an example, the Charging-Rule-Install AVP as defined in clause 5.3.2 of 3GPP TS 29.212 V13.4.0 may be reused for indicating the recurring time interval as well as the activation and deactivation times as follows.

```
Charging-Rule-Install   ::=   < AVP Header: 1001 >
                              *[ Charging-Rule-Definition ]
                              *[ Charging-Rule-Name ]
                              *[ Charging-Rule-Base-Name ]
                              [ Bearer-Identifier ]
                              [ Rule-Activation-Time ]
                              [ Rule-Deactivation-Time ]
                              [ Resource-Allocation-Notification ]
                              [ Charging-Correlation-Indicator ]
                              [ Recurring-Time-Interval ]
                              *[ AVP ]
```

The Recurring-Time-Interval is of a type of Unsiged32, which defines the time interval in Minutes for periodical activation duration.

In another embodiment that the policy information specifies timing for starting and stopping an APN-AMBR, the recurring time interval may be indicated to the PCEF entity in a QoS Information AVP of a CCA-initial message when an IP-CAN session is established. In this case, the policy information as a whole may be provisioned in the QoS information AVP of the CCA-initial message. Additionally or alternatively, the recurring time interval may be indicated to the PCEF in a QoS Information AVP of a CCA-update message or of a RAR message after an IP-CAN session is established. In this case, the policy information as a whole may be provisioned in the QoS information AVP of the CCA-update message or of the RAR message. The recurring time interval represents an interval between successive start of the APN-AMBR or between successive stop of the APN-MMBR.

As an example, the QoS AVP for indicating the recurring time interval as well as start and stop times may be of a format as follows:

```
QoS-Information::= ......
                   APN-AMBR UL
                   APN-AMBR DL
                   Subsequent-APN-AMBR
                   APN-AMBR UL
                   APN-AMBR DL
                   Start-Time
                   Stop-Time
                   Recurring-Time-Interval
                   ... ...
```

In some embodiments, the PCRF may modify the recurring time interval at block 225. Thereby, the recurring time interval indicated to the PCEF may comprise the modified recurring time interval. In such a case, the modified recurring time interval may be indicated to the PCEF in a CCA-update message or in a RAR message.

Although operations in blocks 210-230 are illustrated in a sequential order, it shall be appreciated that some of the operations may be performed in an order different from the illustrated. For example, operations in blocks 220 and 230 may be performed concurrently.

Figure 3:
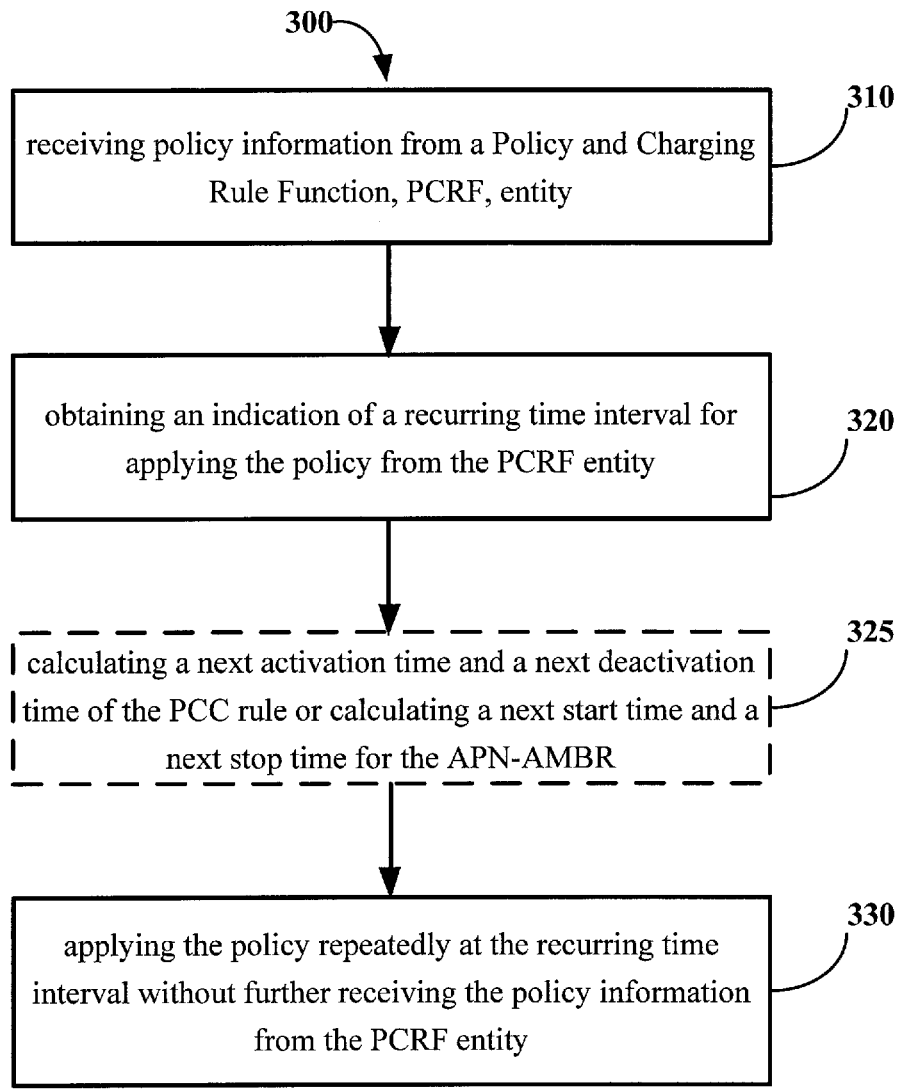
FIG. 3 illustrates a flowchart of a method performed at a PCEF entity for applying a policy according to some embodiments of the present disclosure.

FIG. 3 illustrates a flowchart of a method 300 performed at a PCEF entity for applying a policy according to some embodiments of the present disclosure.

In FIG. 3, operations in blocks with a solid line are essential, while operations in blocks with a broken line are optional depending on various implementations of the method 300.

As illustrated, the method 300 starts at block 310, in which the PCEF entity receives policy information associated with the policy from a PCRF entity, for example passively or in response to its own request. The policy information may specify timing for activating and deactivating a control rule. As mentioned above, the control rule may comprise a PCC rule and an APN-AMBR value as examples. In the example that the control rule comprises a PCC rule, the policy information may specify an activation time for activating the PCC rule and a deactivation time for deactivating the PCC rule. In the example that the control rule comprises an APN-AMBR value, the policy information may specify a start time for starting the APN-AMBR and a stop time for stopping the APN-AMBR.

At block 320, the PCEF entity obtains an indication of a recurring time interval in the policy information for applying the policy from the PCRF entity. At block 330, the PCEF entity applies the policy repeatedly at the recurring time interval without further receiving the policy information from the PCRF entity.

In an embodiment that the policy information specifies timing for activating and deactivating a PCC rule, the recurring time interval represents an interval between successive activation of the PCC rule or between successive deactivation of the PCC rule.

In such an embodiment, the PCEF entity may calculate, at block 325, a next activation time for activating the PCC rule based at least on the activation time and the recurring time interval and also calculate a next deactivation time for deactivating the PCC rule based at least on the deactivation time and the recurring time interval. Accordingly, the PCEF entity may apply the policy by activating the PCC rule at the calculated next activation time and deactivating the PCC rule at the calculated next deactivation time.

In an embodiment that the policy information specifies timing for starting and stopping an APN-AMBR, the recurring time interval represents an interval between successive start of the APN-AMBR or between successive stop of the APN-AMBR.

In such an embodiment, the PCEF entity may calculate a next start time for starting the APN-AMBR based at least on the start time and the recurring time interval and also calculate a next stop time for stopping the APN-AMBR based at least on the stop time and the recurring time interval. Accordingly, the PCEF entity may apply the policy by starting application of the APN-AMBR at the calculated next start time and stopping the application of the APN-AMBR at the calculated next stop time.

Figure 4:
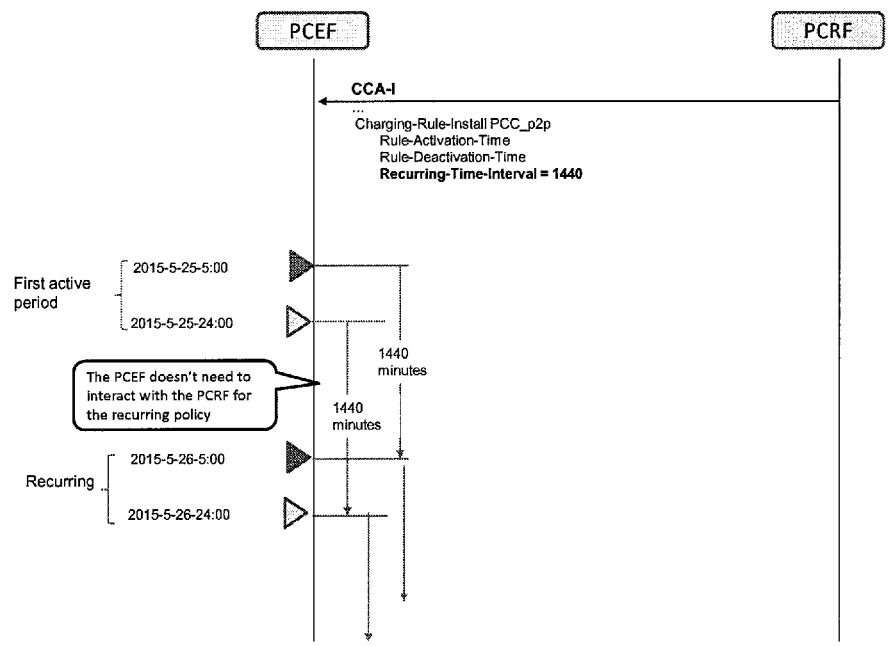
FIG. 4 shows a specific example illustrating the solution for enforcing a time-based policy according to embodiments of the present disclosure.

FIG. 4 shows a specific example illustrating the solution for enforcing a time-based policy according to embodiments of the present disclosure.

As illustrated, when a user sets up a PDN connection (also called IP-CAN session) during the day, the PCRF installs a policy for enforcing a PCC_P2P rule for the PCEF with following values: Rule-Activation-Time="2015-5-25-5:00"; Rule-Deactivation-Time="2015-5-25-24:00"; and Recurring-Time-Interval="1440 minutes".

According to the policy, the PCEF activates the PCC_P2P rule at 5:00 am and deactivates the PCC_P2P rule at 24:00 pm on 2015 May 25 for the first time.

Then, the PCEF may calculate the activation time and the deactivation time for applying the PCC_P2P rule on the next day, i.e. 2015 May 26, based on the indicated Rule-Activation-Time, Rule-Deactivation-Time and Recurring-Time-Interval. The calculated activation time is 5:00 am on 2015 May 26 and the calculated deactivation time is 24:00 pm on 2015 May 26.

Accordingly, the PCEF can repeat the same actions, i.e. activating the PCC_P2P rule at 5:00 am and deactivates the rule at 24:00 pm on 2015 May 26 for the second time without receiving the PCC_P2P rule again from the PCRF.

By this way, the time-based policy may be repeated as expected at the PCEF without unnecessary signalling on the Gx interface.

Figure 5:
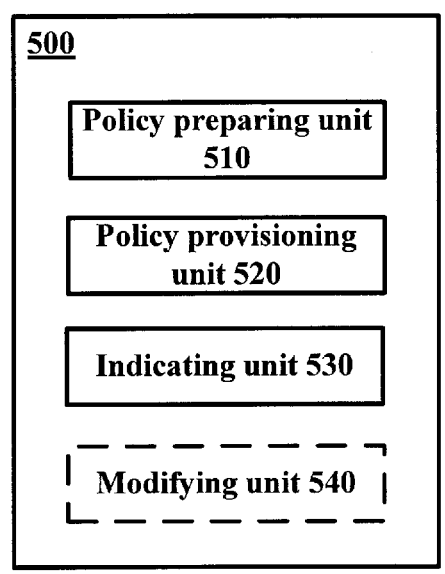
FIG. 5 illustrates a schematic block diagram of an apparatus at a PCRF for provisioning policy information according to some embodiments of the present disclosure.

FIG. 5 illustrates a schematic block diagram of an apparatus 500 that may be embodied at or as a part of a PCRF entity for provisioning policy information according to some embodiments of the present disclosure.

In FIG. 5, units in blocks with a solid line are essential, while units in blocks with a broken line are optional depending on various implementations of the apparatus 500.

Particularly, the apparatus comprises a policy preparing unit 510, a policy provisioning unit 520 and an indicating unit 530. The policy preparing unit 510 is configured to prepare policy information for provision to a PCEF entity. The policy provisioning unit 520 is configured to provision the policy information to the PCEF entity. The policy information may specify timing for activating and deactivating a control rule as mentioned above. The control rule may comprise a PCC rule and an APN-AMBR value as examples.

The indicating unit 530 is configured to indicate a recurring time interval for applying a policy associated with the policy information to the PCEF entity such that the policy can be applied at the PCEF repeatedly at the recurring time interval without further provisioning of the policy information to the PCEF entity.

In an embodiment that the policy information specifies timing for activating and deactivating a PCC rule, the recurring time interval represents an interval between successive activation of the PCC rule or between successive deactivation of the PCC rule.

In such an embodiment, the indicating unit 530 may be configured to indicate the recurring time interval to the PCEF entity in a Charging-Rule-Install AVP of a CCA-initial message upon establishment of an IP-CAN session. Additionally or alternatively, the indicating unit 530 may be configured to indicate the recurring time interval to the PCEF in a Charging-Rule-Install AVP of a CCA-update message or of a RAR message after an IP-CAN session is established.

In an embodiment that the policy information specifies timing for starting and stopping an APN-AMBR, the recurring time interval represents an interval between successive start of the APN-AMBR or between successive stop of the APN-MMBR.

In such an embodiment, the indicating unit 530 may be configured to indicate the recurring time interval to the PCEF entity in a QoS Information AVP of a CCA-initial message when an IP-CAN session is established. Additionally or alternatively, the indicating unit 530 may be configured to indicate the recurring time interval to the PCEF in a QoS Information AVP of a CCA-update message or of a RAR message after an IP-CAN session is established.

In another embodiment, the apparatus 500 may further comprise a modifying unit 540 that is configured to modify the recurring time interval. In this embodiment, the recurring time interval indicated to the PCEF comprises the modified recurring time interval.

The above units 510-540 may be configured to implement corresponding operations or steps in blocks 210-230 of FIG. 2. Thus, units 510-540 of FIG. 5 will not be detailed herein for the purpose of simplicity.

Figure 6:
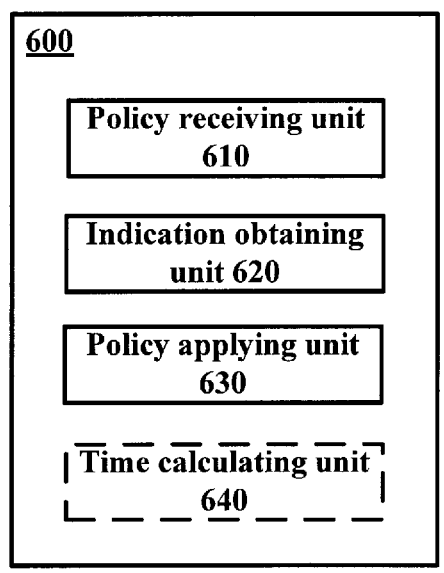
FIG. 6 illustrates a schematic block diagram of an apparatus at a PCEF for applying a policy according to some embodiments of the present disclosure.

FIG. 6 illustrates a schematic block diagram of an apparatus 600 that may be embodied at or as a part of a PCEF entity for applying a policy according to some embodiments of the present disclosure.

In FIG. 6, units in blocks with a solid line are essential while units in blocks with a broken line are optional depending on various implementations of the apparatus 500.

Particularly, the apparatus 600 comprises a policy receiving unit 610, an indication obtaining unit 620 and a policy applying unit 630. The policy receiving unit 610 is configured to receive policy information associated with the policy from a Policy and Charging Rule Function, PCRF, entity. The policy information may specify timing for activating and deactivating a control rule as mentioned above. The control rule may comprise a PCC rule and an APN-AMBR value as examples.

The indication obtaining unit 620 is configured to obtain an indication of a recurring time interval for applying the policy from the PCRF entity.

The policy applying unit 630 is configured to apply the policy repeatedly at the recurring time interval without further receiving the policy information from the PCRF entity.

In an embodiment that the policy information specifies timing for activating and deactivating a PCC Rule, the recurring time interval represents an interval between successive activation of the PCC rule or between successive deactivation of the PCC rule.

The apparatus 600 may further comprise a time calculating unit 640 that is configured to calculate a next activation time for activating the PCC rule based at least on the activation time and the recurring time interval and to calculate a next deactivation time for deactivating the PCC rule based at least on the deactivation time and the recurring time interval. The policy applying unit 630 may be further configured to activate the PCC rule at the calculated next activation time and to deactivate the PCC rule at the calculated next deactivation time.

In an embodiment that the policy information specifies timing for starting and stopping an APN-AMBR, the recurring time interval represents an interval between successive start of the APN-AMBR or between successive stop of the APN-AMBR.

The apparatus 600 may further comprise a time calculating unit 640 that is configured to calculate a next start time for starting application of the APN-AMBR based at least on the start time and the recurring time interval and to calculate a next stop time for stopping the application of the APN-AMBR based at least on the stop time and the recurring time interval. The policy applying unit 630 may be configured to start application of the APN-AMBR at the calculated next start time and to stop the application of the APN-AMBR at the calculated next stop time.

The above units 610-640 may be configured to implement corresponding operations or steps in blocks 310-330 of FIG. 3. Thus, units 610-640 of FIG. 6 will not be detailed herein for the purpose of simplicity.

Figure 7:
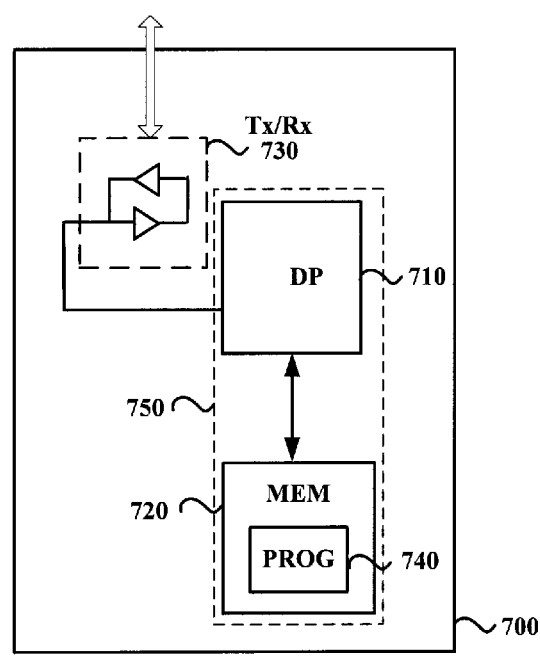
FIG. 7 illustrates a schematic block diagram of an apparatus according to some embodiments of the present disclosure.

FIG. 7 illustrates a schematic block diagram of an apparatus 700 according to some embodiments of the present disclosure. The apparatus 700 may be embodied at or as at least part of a PCRF entity for provisioning policy information or embodied at or as at least part of a PCEF entity for applying a time-based policy.

The apparatus 700 comprises at least one processor 710, such as a data processor (DP) and at least one memory (MEM) 720 coupled to the processor 710. The apparatus 700 may further comprise a transmitter TX and receiver RX 730 coupled to the processor 710 for establishing communications with other network entities. The MEM 720 stores a program (PROG) 740. The PROG 740 may include instructions that, when executed on the associated processor 710, enable the apparatus 700 to operate in accordance with the embodiments of the present disclosure, for example to perform the method 200 or 300. A combination of the at least one processor 710 and the at least one MEM 720 may form processing means 750 adapted to implement various embodiments of the present disclosure.

The MEM 720 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processor 710 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

A person skilled in the art shall appreciate that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a Policy and Charging Rule Function, PCRF, entity for provisioning policy information, the method comprising:
   preparing policy information for provision to a Policy and Charging Enforcement Function, PCEF, entity;
   provisioning the policy information to the PCEF entity, wherein the policy information specifies timing for starting and stopping an Access Point Name-Aggregated Max Bit Rate, APN-AMBR; and
   indicating a recurring time interval in the policy information for applying a policy associated with the policy information to the PCEF entity such that the policy can be applied at the PCEF repeatedly at the recurring time interval without further provisioning of the policy information to the PCEF entity, wherein the recurring time interval represents an interval between successive starts of the APN-AMBR or between successive stops of the APN-AMBR.

2. The method according to claim 1, wherein the policy information specifies timing for activating and deactivating a Policy and Charging Control, PCC, Rule and the recurring time interval represents an interval between successive activation of the PCC rule or between successive deactivation of the PCC rule.

3. The method according to claim 2, wherein the recurring time interval is indicated to the PCEF entity in a Charging-Rule-Install Attribute Value Pair, AVP of a Credit-Control-Answer, CCA-initial message upon establishment of an Internet Protocol-Connectivity Access Network session.

4. The method according to claim 2, wherein the recurring time interval is indicated to the PCEF in a Charging-Rule-Install Attribute Value Pair, AVP of a Credit-Control-Answer, CCA-update message or of a Re-Auth-Request, RAR, message after an Internet Protocol-Connectivity Access Network session is established.

5. The method according to claim 1, wherein the recurring time interval is indicated to the PCEF entity in a Quality of Service, QoS, Information Attribute Value Pair, AVP, of a Credit-Control-Answer, CCA-initial message when an Internet Protocol-Connectivity Access Network session is established.

6. The method according to claim 1, wherein the recurring time interval is indicated to the PCEF in a Quality of Service, QoS, Information Attribute Value Pair, AVP, of a Credit-Control-Answer, CCA-update message or of a Re-Auth-Request, RAR, message after an Internet Protocol-Connectivity Access Network session is established.

7. The method according to claim 1, further comprising:
   modifying the recurring time interval;
   wherein the recurring time interval indicated to the PCEF comprises the modified recurring time interval.

8. A method at a Policy and Charging Enforcement Function, PCEF, entity for applying a policy, the method comprising:
   receiving policy information associated with the policy from a Policy and Charging Rule Function, PCRF, entity, wherein the policy information specifies timing for starting and stopping an Access Point Name-Aggregated Max Bit Rate, APN-AMBR;
   obtaining an indication of a recurring time interval in the policy information for applying the policy from the PCRF entity; and
   applying the policy repeatedly at the recurring time interval without further receiving the policy information from the PCRF entity, the recurring time interval represents an interval between successive starts of the APN-AMBR or between successive stops of the APN-AMBR.

9. The method according to claim 8, wherein the policy information specifies timing for activating and deactiviating a Policy and Charging Control, PCC, Rule and the recurring time interval represents an interval between successive activation of the PCC rule or between successive deactivation of the PCC rule.

10. The method according to claim 9, further comprising:
    calculating a next activation time for activating the PCC rule based at least on the activation time and the recurring time interval and a next deactivation time for deactivating the PCC rule based at least on the deactivation time and the recurring time interval;
    wherein applying the policy further comprises:
    activating the PCC rule at the calculated next activation time; and
    deactivating the PCC rule at the calculated next deactivation time.

11. The method according to claim 8, further comprising:
    calculating a next start time for starting the APN-AMBR based at least on the start time and the recurring time interval and a next stop time for stopping the APN-AMBR based at least on the stop time and the recurring time interval;

wherein applying the policy further comprises:
starting the APN-AMBR at the calculated next start time; and
stopping the APN-AMBR at the calculated next stop time.

12. An apparatus at a Policy and Charging Enforcement Function, PCEF, entity for applying policy information, the apparatus comprising a processor and a memory, said memory containing instructions executable by said processor, whereby said apparatus is operative to perform the method of claim 8.

* * * * *